(12) United States Patent
Gabriele et al.

(10) Patent No.: US 11,343,663 B2
(45) Date of Patent: *May 24, 2022

(54) BEACON-TRIGGERED ACTIVATION OF A NEAR FIELD COMMUNICATION APPLICATION

(71) Applicant: Capital One Services, LLC, McLean, VA (US)

(72) Inventors: David Gabriele, Boston, MA (US); Wayne Lutz, Fort Washington, MD (US); Lin Ni Lisa Cheng, Fresh Meadows, NY (US); Daniel John Marsch, Arlington, VA (US); Tyler Maiman, Melville, NY (US); Saleem Ahmed Sangi, McLean, VA (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,821

(22) Filed: Aug. 28, 2020

(65) Prior Publication Data

US 2021/0044951 A1    Feb. 11, 2021

Related U.S. Application Data

(63) Continuation of application No. 16/747,985, filed on Jan. 21, 2020, now Pat. No. 10,798,551, which is a
(Continued)

(51) Int. Cl.
*H04W 4/80* (2018.01)
*G01S 1/68* (2006.01)
(Continued)

(52) U.S. Cl.
CPC ............... *H04W 4/80* (2018.02); *G01S 1/68* (2013.01); *G06Q 20/3278* (2013.01);
(Continued)

(58) Field of Classification Search
CPC ........ H04W 4/80; H04W 24/08; H04W 4/029; H04W 52/0229; H04W 52/0245;
(Continued)

(56) References Cited

U.S. PATENT DOCUMENTS 6,782,253 B1 * 8/2004 Shteyn .................... H04L 67/18
455/414.1
7,079,008 B2   7/2006 Castle et al.
(Continued)

FOREIGN PATENT DOCUMENTS

KR    101 709 192    2/2017

OTHER PUBLICATIONS

Notification of Transmittal of The International Search Report and The Written Opinion of the International Searching Authority from Application No. PCT/US2019/034851 dated Aug. 16, 2019.
(Continued)

*Primary Examiner* — Julio R Perez
(74) *Attorney, Agent, or Firm* — Hunton Andrews Kurth LLP

(57) ABSTRACT

An automated method is provided for activating a NFC application in a mobile interface device. In this method, the device receives from a beacon a wireless beacon signal comprising at least one beacon identifier. The wireless beacon signal is processed by the mobile interface device to determine the at least one beacon identifier. The mobile interface device determines based on the at least one beacon identifier, whether to activate the NFC application. Responsive to a determination that the NFC application should be activated, the mobile interface device transitions the NFC
(Continued)

application from a passive state to an active state. NFC communication is then established between the mobile interface device and at least one NFC transmitting device disposed within a beacon range volume defined by the beacon location and the beacon range.

20 Claims, 10 Drawing Sheets

Related U.S. Application Data continuation of application No. 16/428,478, filed on May 31, 2019, now Pat. No. 10,616,745.

(60) Provisional application No. 62/679,571, filed on Jun. 1, 2018.

(51) Int. Cl.
| | | |
|---|---|---|
| *H04W 4/029* | (2018.01) | |
| *H04B 17/318* | (2015.01) | |
| *H04W 52/02* | (2009.01) | |
| *H04W 64/00* | (2009.01) | |
| *G06Q 20/32* | (2012.01) | |
| *H04L 67/141* | (2022.01) | |
| *H04W 24/08* | (2009.01) | |
| *H04W 76/10* | (2018.01) | |
| *G06F 3/01* | (2006.01) | |
| *G06F 3/14* | (2006.01) | |

(52) U.S. Cl.
CPC ......... *H04B 17/318* (2015.01); *H04L 67/141* (2013.01); *H04W 4/029* (2018.02); *H04W 24/08* (2013.01); *H04W 52/0229* (2013.01); *H04W 52/0245* (2013.01); *H04W 64/003* (2013.01); *G06F 3/017* (2013.01); *G06F 3/14* (2013.01); *H04W 76/10* (2018.02)

(58) Field of Classification Search
CPC ............... H04W 64/003; H04W 76/10; G06Q 20/3278; G06Q 20/3263; G06Q 20/3224; G06Q 20/40155; H04L 67/141; H04L 67/18; G01S 1/68; H04B 17/318; H04B 5/0062; H04B 5/0056; H04B 17/27; H04B 5/00; G06F 3/017; G06F 3/14; G06F 3/0346; Y02D 30/70

See application file for complete search history.

(56) References Cited

U.S. PATENT DOCUMENTS

| | | | |
|---|---|---|---|
| 7,423,525 B2 | 9/2008 | Bandy | |
| 7,474,196 B2 | 1/2009 | Vesikivi et al. | |
| 7,486,171 B2 | 2/2009 | Kim et al. | |
| 7,541,930 B2 | 6/2009 | Saarisalo et al. | |
| 8,214,910 B1 | 7/2012 | Gossweiler, III et al. | |
| 8,281,335 B2 | 10/2012 | Urdang et al. | |
| 8,325,020 B2 | 12/2012 | Izadi et al. | |
| 8,380,246 B2 | 2/2013 | Wilson et al. | |
| 8,612,767 B2 | 12/2013 | Gossweiler, III et al. | |
| 8,618,932 B2 | 12/2013 | Maia et al. | |
| 8,638,190 B1* | 1/2014 | Want .................... | G06F 3/0346 340/5.1 |
| 8,738,024 B1* | 5/2014 | Kerr .................... | G06Q 30/0233 455/456.5 |
| 8,750,795 B2* | 6/2014 | Krutt .................... | H04W 4/50 455/41.1 |
| 8,922,348 B2 | 12/2014 | Leonard et al. | |
| 9,021,270 B1 | 4/2015 | Byers et al. | |
| 9,113,235 B2 | 8/2015 | Choi et al. | |
| 9,135,424 B2* | 9/2015 | Taveau .................... | G06Q 20/32 |
| 9,219,979 B2 | 12/2015 | Moldavsky et al. | |
| 9,460,573 B1 | 10/2016 | Cordes et al. | |
| 9,531,858 B2 | 12/2016 | Thuroe | |
| 9,538,332 B1* | 1/2017 | Mendelson ......... | H04W 40/244 |
| 9,538,370 B2 | 1/2017 | Ko et al. | |
| 9,564,950 B2 | 2/2017 | Jin et al. | |
| 9,569,163 B2 | 2/2017 | Gai et al. | |
| 9,571,164 B1 | 2/2017 | Luo et al. | |
| 9,571,956 B2 | 2/2017 | Gai et al. | |
| 9,578,481 B2 | 2/2017 | Gai et al. | |
| 9,633,243 B1 | 4/2017 | Geist et al. | |
| 9,641,969 B2 | 5/2017 | Theurer et al. | |
| 9,961,523 B1* | 5/2018 | Daoura .................... | H04W 4/12 |
| 10,798,551 B2* | 10/2020 | Gabriele ............... | H04W 4/029 |
| 2004/0176032 A1 | 9/2004 | Kotola et al. | |
| 2005/0033619 A1 | 2/2005 | Barnes et al. | |
| 2005/0160003 A1 | 7/2005 | Berardi et al. | |
| 2006/0094405 A1 | 5/2006 | Dupont | |
| 2006/0094411 A1 | 5/2006 | Dupont | |
| 2006/0094412 A1 | 5/2006 | Nonoyama et al. | |
| 2006/0293069 A1 | 12/2006 | Patel et al. | |
| 2007/0075133 A1 | 4/2007 | Yeager | |
| 2007/0109103 A1 | 5/2007 | Jedrey et al. | |
| 2008/0030304 A1 | 2/2008 | Doan et al. | |
| 2008/0094217 A1 | 4/2008 | Okamasu et al. | |
| 2008/0191878 A1 | 8/2008 | Abraham | |
| 2009/0036165 A1 | 2/2009 | Brede | |
| 2009/0177530 A1* | 7/2009 | King ....................... | H04L 67/22 705/76 |
| 2010/0075601 A1 | 3/2010 | Yuasa | |
| 2010/0090831 A1 | 4/2010 | Zhao et al. | |
| 2010/0156609 A1 | 6/2010 | Kim et al. | |
| 2010/0294835 A1 | 11/2010 | Bam et al. | |
| 2011/0084811 A1 | 4/2011 | Park et al. | |
| 2011/0212687 A1* | 9/2011 | Foster ............... | H04M 1/72463 455/41.1 |
| 2011/0212688 A1* | 9/2011 | Griffin .............. | H04M 1/72454 455/41.1 |
| 2011/0215902 A1 | 9/2011 | Brown, III et al. | |
| 2012/0059741 A1 | 3/2012 | Khan et al. | |
| 2012/0075068 A1 | 3/2012 | Walker et al. | |
| 2012/0105200 A1 | 5/2012 | Yoo et al. | |
| 2012/0127976 A1 | 5/2012 | Lin et al. | |
| 2012/0190301 A1 | 7/2012 | Hart | |
| 2012/0223815 A1 | 9/2012 | Dennard et al. | |
| 2012/0250539 A1* | 10/2012 | Lin ........................ | H04B 17/27 370/252 |
| 2012/0316950 A1 | 12/2012 | LaPorte et al. | |
| 2013/0002405 A1 | 1/2013 | Pesonen et al. | |
| 2013/0021139 A1 | 1/2013 | Guo | |
| 2013/0065526 A1 | 3/2013 | Pottier et al. | |
| 2013/0095790 A1 | 4/2013 | Park et al. | |
| 2013/0109369 A1 | 5/2013 | Forutanpour et al. | |
| 2013/0110657 A1 | 5/2013 | Forster | |
| 2013/0166399 A1 | 6/2013 | Awad | |
| 2013/0225079 A1 | 8/2013 | Ashour et al. | |
| 2013/0229265 A1 | 9/2013 | Sajadi et al. | |
| 2013/0237152 A1 | 9/2013 | Taggar et al. | |
| 2013/0244575 A1* | 9/2013 | Forutanpour ........... | H04W 4/80 455/41.1 |
| 2013/0257804 A1 | 10/2013 | Vu et al. | |
| 2013/0281014 A1 | 10/2013 | Frankland et al. | |
| 2013/0288594 A1 | 10/2013 | Yeh | |
| 2013/0303085 A1 | 11/2013 | Boucher et al. | |
| 2013/0309964 A1 | 11/2013 | Hall et al. | |
| 2013/0311313 A1* | 11/2013 | Laracey ............... | G06Q 20/327 705/16 |
| 2013/0335201 A1 | 12/2013 | Kang et al. | |
| 2014/0085090 A1 | 3/2014 | Yeo | |
| 2014/0201086 A1 | 7/2014 | Gadotti et al. | |
| 2014/0203918 A1 | 7/2014 | Hori | |
| 2014/0256249 A1 | 9/2014 | Tse et al. | |
| 2015/0002275 A1 | 1/2015 | Jantunen et al. | |
| 2015/0019432 A1 | 1/2015 | Burns | |
| 2015/0032603 A1* | 1/2015 | Rutherford ........ | G06Q 20/3278 705/39 |
| 2015/0077228 A1* | 3/2015 | Dua .................... | G06Q 20/3674 340/5.81 |

(56) References Cited

U.S. PATENT DOCUMENTS

| | | |
|---|---|---|
| 2015/0161641 A1 | 6/2015 | Barnes et al. |
| 2015/0294210 A1 | 10/2015 | Martinez de Velasco Cortina et al. |
| 2015/0304804 A1* | 10/2015 | Lotito .................. H04W 4/025 455/41.1 |
| 2015/0332240 A1* | 11/2015 | Harwood ............. G06Q 20/327 705/21 |
| 2016/0086029 A1* | 3/2016 | Dubuque ........... G06K 9/00979 382/159 |
| 2016/0277999 A1* | 9/2016 | Graves ................ H04L 67/2804 |
| 2016/0278012 A1 | 9/2016 | Kawahara et al. |
| 2016/0300285 A1* | 10/2016 | Gandhi ............. G06K 19/0723 |
| 2016/0316317 A1 | 10/2016 | Mayiras |
| 2016/0360348 A1 | 12/2016 | Ueda |
| 2016/0379269 A1* | 12/2016 | Ellis ..................... H04L 67/306 705/14.45 |
| 2017/0006440 A1* | 1/2017 | Postrel ................... H04L 67/18 |
| 2017/0071018 A1 | 3/2017 | Pidhorodetskyi et al. |
| 2017/0091496 A1 | 3/2017 | Nevarez Pedroza |
| 2017/0228776 A1* | 8/2017 | Walden ............. G06Q 30/0273 |
| 2017/0236345 A1 | 8/2017 | Watters |
| 2017/0251334 A1 | 8/2017 | Bogestam et al. |
| 2017/0308692 A1 | 10/2017 | Yano |
| 2018/0014187 A1 | 1/2018 | Chan et al. |
| 2018/0027208 A1 | 1/2018 | Sardar et al. |
| 2018/0054735 A1 | 2/2018 | Hart |
| 2018/0341988 A1* | 11/2018 | Mardikar .............. G06F 16/337 |
| 2019/0369711 A1* | 12/2019 | Wang .................. H04W 24/08 |
| 2019/0373431 A1* | 12/2019 | Gabriele .......... H04W 52/0245 |

OTHER PUBLICATIONS

Notification of Transmittal of The International Search Report and The Written Opinion of the International Searching Authority from related Application No. PCT/US2019/034869 dated Aug. 26, 2019.
Notification of Transmittal of The International Search Report and The Written Opinion of the International Searching Authority from related Application No. PCT/US2019/034847 dated Aug. 27, 2019.
European Extended Search Report issued in related European Patent Application No. EP 19811974.5, dated Jan. 7, 2022.

* cited by examiner

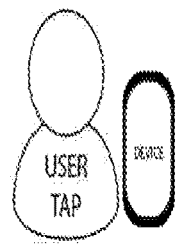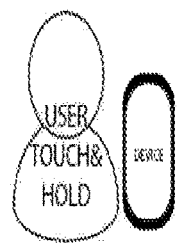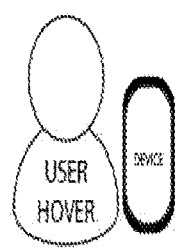
FIG. 5A
FIG. 5B

BEACON-TRIGGERED ACTIVATION OF A NEAR FIELD COMMUNICATION APPLICATION

This application is a Continuation of U.S. application Ser. No. 16/747,985, filed Jan. 21, 2020, which is a Continuation of U.S. application Ser. No. 16/428,478, filed May 31, 2019, which claims priority to U.S. Provisional Patent Application 62/679,571, filed Jun. 1, 2018, the complete disclosures of which are incorporated herein by reference.

FIELD OF THE INVENTION

This application relates generally to communication with contactless interfaces (e.g., radio-frequency identification (RFID) tags and other near field communication (NFC) devices) and device enhancement, and, more particularly, to beacon-triggered activation of an NFC application in a mobile interface device.

BACKGROUND OF THE INVENTION

In the related art, the functionality of contactless interface points and readers (e.g., RFID and other NFC devices) typically provides for the acquiring of a single source of static information. This static information provision does not provide for nuanced device and function management. Accordingly, there is a need for improved systems and methods to provide enhancements to contactless interface points, contactless interface point functionality, and contactless interface point readers, including user devices. Embodiments of the present disclosure are directed to these and other considerations.

SUMMARY OF THE INVENTION

An illustrative aspect of the invention provides an automated method of activating a NFC application in a mobile interface device. The method comprises receiving, by the mobile interface device from a beacon having a beacon location and an associated beacon range, a wireless beacon signal comprising at least one beacon identifier. The wireless beacon signal is processed by the mobile interface device to determine the at least one beacon identifier. The method further comprises determining, by the mobile interface device based on the at least one beacon identifier, whether to activate the NEC application. Responsive to a determination that the NEC application should be activated, the mobile interface device transitions the NEC application from a passive state to an active state. The method also comprises establishing NEC communication between the mobile interface device and at least one NFC transmitting device disposed within a beacon range volume defined by the beacon location and the beacon range.

Another aspect of the invention provides a mobile interface device comprising a data processor, a wireless communication interface in communication with the data processor and configured for selective communication over a wireless network, a near field communication (NFC) interface, a beacon signal receiver, a user interface comprising at least a user input device and a display, and a memory accessible by the data processor. The memory has stored thereon an NFC application having a passive state and an active state. The NFC application includes instructions for the data processor to receive a signal from an NFC transmitting device via the NFC interface when the NFC application is in the active state. The memory also has stored thereon a beacon monitoring application. The beacon monitoring application includes instructions for the data processor to receive a wireless beacon signal from a beacon via the beacon signal receiver, process the wireless beacon signal to identify the beacon, and determine if the beacon is an authorized beacon. Responsive to a determination that the beacon is an authorized beacon, the data processor is instructed to transition the NFC application from the passive state to the active state.

Another aspect of the invention provides an NFC system comprising a beacon for transmitting a beacon signal comprising at least one beacon identifier. The beacon has a beacon location and an associated beacon range. The NFC system further comprises an NFC transmitting device disposed within a beacon range volume defined by the beacon location and the beacon range. The NFC system also comprises a user interface device comprising a data processor, an NFC interface, a beacon signal receiver, and a memory accessible by the data processor. The memory has stored thereon an NFC application having a passive state and an active state. The NFC application is configured for allowing communication between the data processor and the NFC transmitting device via the NFC interface when the NFC application is in the active state. The memory also has stored thereon a beacon monitoring application. The beacon monitoring application is configured for instructing the data processor to receive the beacon signal from the beacon via the beacon signal receiver and determine if the beacon is an authorized beacon. Responsive to a determination that the beacon is an authorized beacon, the data processor is instructed to cause the NFC application to change from the passive state to the active state.

BRIEF DESCRIPTION OF THE DRAWINGS

The invention can be more fully understood by reading the following detailed description together with the accompanying drawings, in which like reference indicators are used to designate like elements, and in which:

FIG. 5A illustrates flow diagrams of certain aspects of the present disclosure;

FIG. 5B is an example flowchart of a method of the present disclosure;

DETAILED DESCRIPTION OF THE INVENTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although RFIDs, RFID stickers, RFID devices, RFID kiosks, etc., are generally used herein, these are merely examples. One of ordinary skill will recognize that, in light of the present disclosure, the RFID technology may be substituted or augmented with various types of contactless or wireless technologies. As non-limiting examples, various aspects of the present disclosure may utilize one or more of NFC tags, RFID stickers, and NXP MIFARE stickers, image codes (e.g., one-or two dimensional barcodes or QR codes), as well as interface points for different frequency readers (e.g., readers attuned to non-traditional contactless interface point tunings), and contactless interface points designed for different technologies (e.g., sonic readers or X-ray readers) may be used in addition to or in place of RFID devices.

Figure 1:
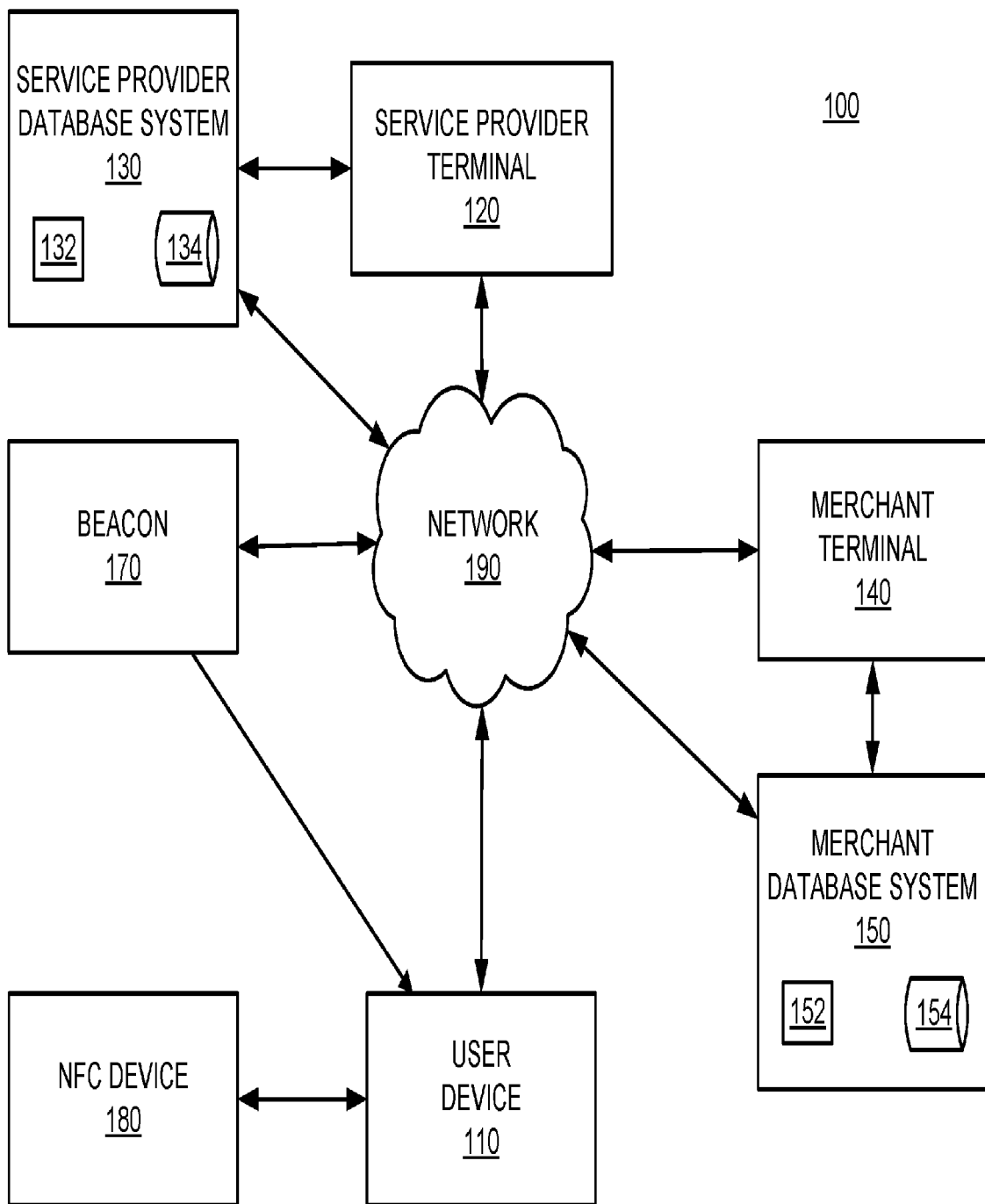
FIG. 1 is an example block diagram representing a system environment that may implement one or more aspects of the present disclosure.

FIG. 1 illustrates a system environment 100 in which one or more aspects of the present disclosure may be implemented. System environment 100 may include one or more of a user device 110, a service provider terminal 120, a service provider database system 130, a merchant terminal 140, a merchant database system 150, a beacon 170, an NFC device 180, and a network 190. In some cases, system environment 100 may include one or more of each of user devices 110, service provider terminals 120, service provider database systems 130, merchant terminals 140, merchant database systems 150, beacons 170, NFC devices 180, and networks 190. A non-limiting example of a computer system architecture that can implement one or more of user device 110, service provider terminal 120, service provider database system 130, merchant terminal 140, merchant database system 150, and beacon 170 will be described below in greater detail with reference to FIG. 9.

User device 110 may include, as non-limiting examples, a mobile interface device (e.g., a smart phone, tablet computer, smart wearable device, portable laptop computer, voice command device, or other mobile computing device) or a stationary computing device (e.g., a stationary desktop or other stationary computer). In some embodiments, user device 110 may be configured to interact with one or more of service provider terminal 120, service provider database system 130, merchant terminal 140, merchant database system 150, beacon 170, and NFC device 180, either directly or over network 190. User device 110 and may be equipped with a display, speakers or other auditory devices, tactile simulators, haptic sensors, cameras, light projectors, input devices, distance measuring equipment, 3D scanners, IR sensors, microphones, orientation/position/location sensors, accelerometers, and other devices.

Figure 2:
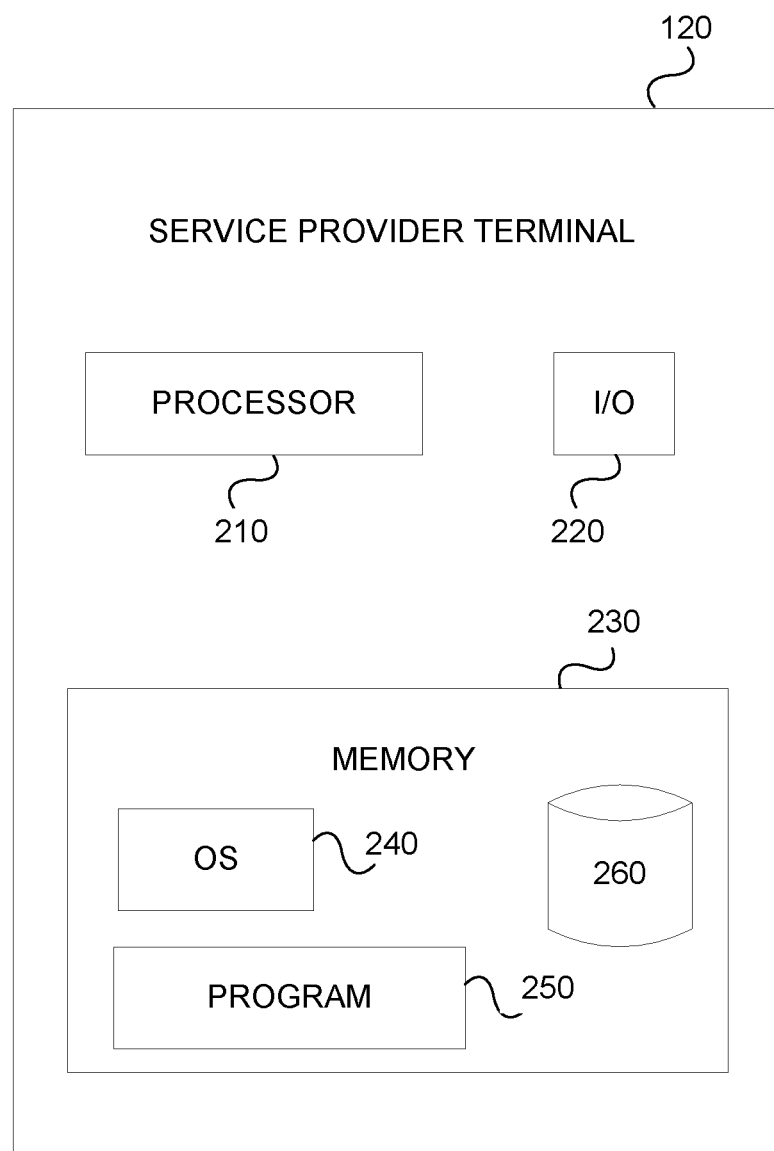
FIG. 2 is a component diagram of an example service provider terminal.

An exemplary embodiment of service provider terminal 120 is shown in more detail in FIG. 2. User device 110, service provider database system 130, merchant terminal 140, merchant database system 150, and beacon 170 may have a similar structure and components that are similar to those described with respect to service provider terminal 120. As shown, service provider terminal 120 may include a processor 210, an input/output ("I/O") device 220, a memory 230 containing an operating system ("OS") 240 and a program 250. For example, service provider terminal 120 may be a single server or may be configured as a distributed computer system including multiple servers or computers that interoperate to perform one or more of the processes and functionalities associated with the disclosed embodiments. In some embodiments, the service provider terminal 120 may further include a peripheral interface, a transceiver, a mobile network interface in communication with the processor 210, a bus configured to facilitate communication between the various components of the service provider terminal 120, and a power source configured to power one or more components of the service provider terminal 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with, for example, one or more of: radio-frequency identification (RFID), near-field communication (NFC), Bluetooth™, low-energy Bluetooth™ (BLE), WiFi™, ZigBee™, Z-Wave™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 120 may include one or more storage devices configured to store information used by processor 210 (or other components) to perform certain functions related to the disclosed embodiments. In one example, service provider terminal 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include one or more databases 260, for storing related data to enable service provider terminal 120 to perform one or more of the processes and functionalities associated with the disclosed embodiments.

Service provider terminal 120 may also be communicatively connected to one or more memory devices (e.g., databases (not shown)) locally or through a network. The remote memory devices may be configured to store information and may be accessed and/or managed by service provider terminal 120. By way of example, the remote memory devices may be document management systems, Microsoft™ SQL databases, SharePoint™ databases, Oracle™ databases, Sybase™ databases, or other relational databases. Systems and methods consistent with disclosed embodiments, however, are not limited to separate databases or even to the use of a database.

Service provider terminal 120 may also include one or more I/O devices 220 that may comprise one or more interfaces for receiving signals or input from devices and providing signals or output to one or more devices that allow data to be received and/or transmitted by service provider terminal 120. For example, service provider terminal 120 may include interface components, which may provide interfaces to one or more input devices, such as one or more keyboards, mouse devices, touch screens, track pads, trackballs, scroll wheels, digital cameras, microphones, sensors, and the like, that enable service provider terminal 120 to receive data from one or more users (such as via user terminal 120).

In exemplary embodiments of the disclosed technology, service provider terminal 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 120 may include a greater or lesser number of components than those illustrated.

Service provider database 130 may have one or more processors 132 and one or more memory 134, which may be any suitable repository of merchant data. Service provider 130 may be located at a service provider database 130 location, off-site at another service provider location, or at a third-party location. Information stored in memory 134 may be accessed (e.g., retrieved, updated, and added to) via network 190 by one or more devices (e.g., service provider terminal 120). Memory 134 may store information relating to, as non-limiting examples, a user profile, RFID and/or beacon configurations, and merchant information.

Merchant terminal 140 may have one or more POS devices 142 that communicate with one or more devices (e.g., user device 110) via network 190. In some embodiments, POS device 162 may communicate with one or more devices (e.g., user device 110) using short-range communication.

Merchant database 150 may have one or more processors 152 and one or more memory 154, which may be any suitable repository of merchant data. Merchant database 150 may be located at the POS location, off-site at another merchant location, or at a third-party location. Information stored in memory 154 may be accessed (e.g., retrieved, updated, and added to) via network 190 by one or more devices (e.g., service provider terminal 120) of system environment 100. Memory 154 may store information relating to products and services offered by merchants such as pricing, quantity, availability, discounts, reviews, and any other such generally available information that a consumer may utilize in making a purchasing decision. In some embodiments, memory 154 may also include location information associated with products and services that identifies the location(s) that a particular product or service is available for purchase. In some embodiments, the location information may include an identification of a particular store, terminal, or kiosk that the product or service may be purchased from.

Beacon 170 may output a signal (e.g., constantly, periodically, or randomly). In some embodiments, one or more of the beacons 170 may be positioned proximate a POS location and configured to output a signal to one or more other devices of the system 100 that are within a predetermined range of the respective beacon 170 (e.g., to user device 110 of a customer walking through a store). The signal may include preset information. For example, the information may be detected by the user device 110 (e.g., an application executing on the user device 110), which triggers the user device 110 to perform some action. In some cases, beacon 170 may be modified (e.g., to change the information transmitted or the transmission pattern/strength). Beacon 170 may be connected to network 190, and may be, as a non-limiting example, modified by service provider terminal 120.

The signal of a beacon 170 may contain two numbers referred to herein as the beacon's major and minor identifiers. These identifiers may be used to identify the beacon's location. In particular applications, the beacon's major identifier may be associated with a relatively large area or building (e.g., a store or other business) in which multiple beacons may be positioned. In such applications, the minor identifier may be associated with a smaller area (e.g., a retail department) that is within the larger area and within which the particular beacon is located. In some applications, the beacon's signal may also include a source identifier that identifies the controlling entity (e.g., a merchant) associated with the beacon. As is discussed in more detail below, the user device 110 may be configured, not only to detect the signal from a beacon 170, but to determine a signal strength as well. This may allow the determination of a distance from the beacon 170.

NFC device 180 may be any form of NFC transmitter and/or receiver. In particular embodiments, the NFC device 180 may be or comprise an RFID transmitter or receiver. Such a device may be active or passive and may be in communication with other RFID-capable devices in the system 100. In some embodiments, the NFC device 180 may be configured to broadcast predetermined information, thereby acting as an NFC transmitter configured to communicate with an NFC reader. For example, user device 110 may receive (e.g., using an application) transmitted information from an NFC device 180. In some cases, user device 110 may then transmit the received information to service provider terminal 120. Service provider terminal 120 may reference data stored in service provider database system 130 to determine what trigger NFC device 180 represents. For example, in some cases, NFC device 180 may be associated with a location either directly (embedded NFC device information) or indirectly (NFC device information is a location pointer), and confirmation of user device 110 being within a predetermined range of that location may trigger one or more predetermined actions or steps of a method described herein. In some cases, service provider terminal 120 may transmit the interpretation of the data back to user device 110.

While the NFC device 180 may often be an RFID device, this is merely an example, and one of ordinary skill will recognize that various different types of contactless interface points may be utilized in system environment 100. For example, one or more of NFC tags, RFID stickers, and NXP MIFARE stickers, as well as interface points for different frequency readers (e.g., readers attuned to non-traditional contactless interface point tunings), non IoT devices, and contactless interface points designed for different technologies (e.g., sonic readers or X-ray readers) may be used within system environment 100. User device 110 may receive and read transmissions from the various types of contactless interface points in similar manner as discussed herein, or as modified in a manner understood by one of ordinary skill in light of the present disclosure. The user device 110 may utilize the information gathered from the various NFC devices 180, for example, as "location-based IDs," as triggers to perform a function, or to contact a database for more information, as will be discussed in greater detail below.

Network 190 may be of any suitable type, including individual connections via the internet such as cellular or WiFi networks. In some embodiments, network 190 may connect terminals using direct connections such as radio-frequency identification (RFID), near-field communication (NFC), Bluetooth', low-energy Bluetooth' (BLE), WiFi™, ZigBee', Z-Wave', ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Location based services (LBS) are often dependent on GPS and user-confirmed tracking input. In the related art, users may be prompted by the LBS to select their locations when GPS is unavailable. For example, GPS is often unreliable when inside a building (e.g., inside a mall), so LBSs rely on user-selected locations to determine what store a user is in. This can lead to LBS location requests out of context to where the LBSs would be useful. Thus, users may be inconvenienced by inconsistent LBS availability, and annoyed by unwarranted LBS requests. Accordingly, users may deactivate, deactivate, or otherwise limit the LBS and related capabilities, which decreases user engagement and LBS utility. Accordingly, certain aspects of the present disclosure relate to the use of contactless interface points (e.g., RFIDs) to provide location information, which may be used to improve LBS services.

Figures 3A, 3B:
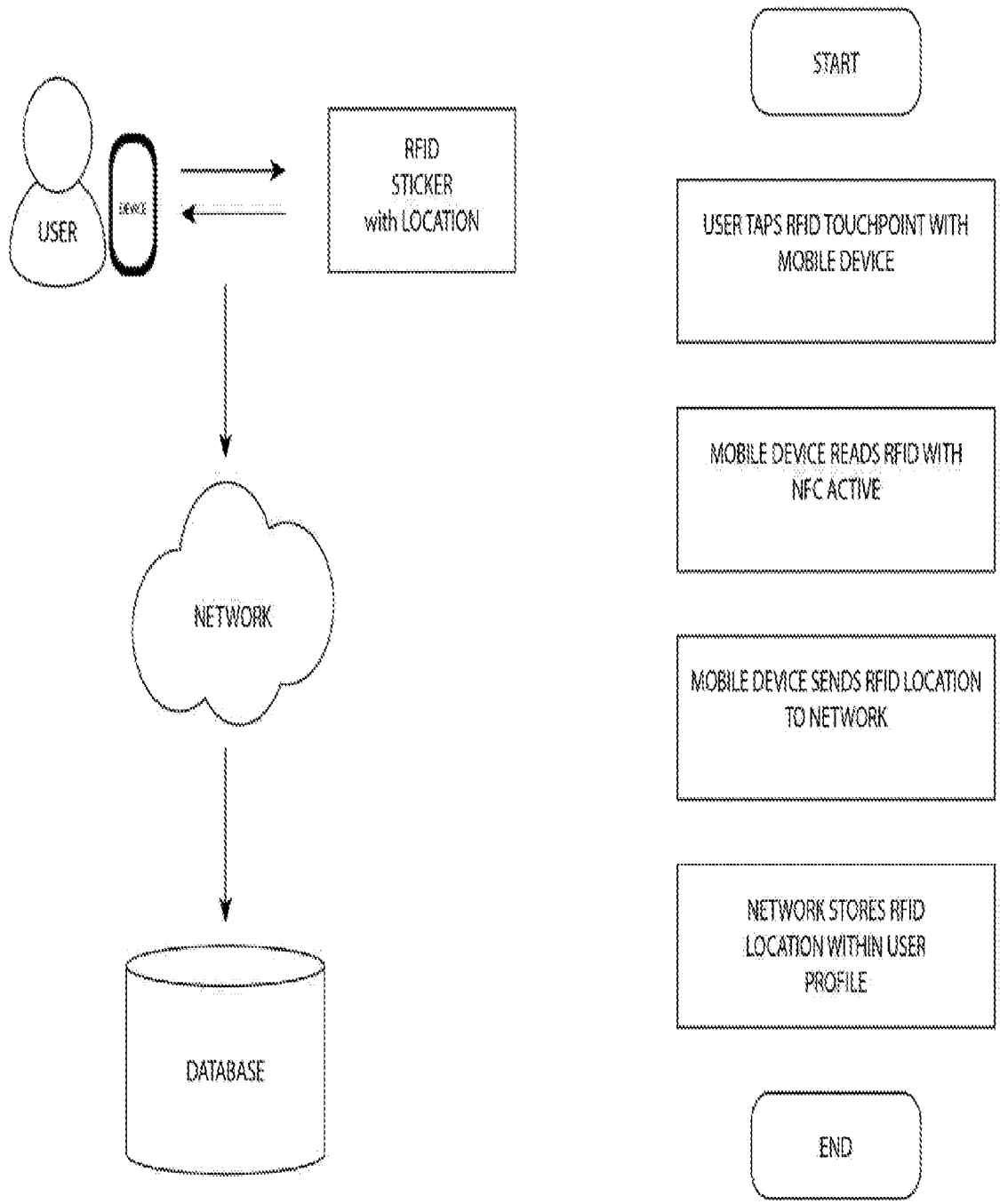
FIG. 3A illustrates a system environment for implementing certain aspects of the present disclosure.
FIG. 3B is an example flowchart of a method of the present disclosure.

FIG. 3A illustrates a system environment for implementing certain aspects of the present disclosure. In the system environment of FIG. 3A, a user device (e.g., user device 110, which may be a mobile device) operated by a user, an NFC device (e.g., an RFID sticker), a network (e.g., network 190), and a database (e.g., service provider database system 130) may interact. The user may operate the user device to execute an RFID reader application, and the user may move the user device near the RFID sticker. The user device may interpret the information from the RFID sticker and provide the information to the database over the network. The information may include location information (e.g., coordinates, store name and number, geo-coding, encoded location information, or encrypted location information) or RFID information ((e.g., an RFID specifier that is associated with a geographic location in the database). With RFID sticker systems embedded in environments, users may easily "opt-in" to LBS, for example by tapping or otherwise reading RFID touch point s with their devices. This allows location-based data to be generated outside of traditional GPS system networks and enables contextual "opt-in" opportunities relevant to the user's contexts. For example, after checking in by tapping on the RFID sticker (or otherwise reading or scanning a contactless interface point), an LBS may provide the user device information about special events nearby (e.g., photos with Santa or limited-time deals).

In some cases, reading the device may not operate as a strict opt-in to an LBS (i.e., may not have include the user electing to receive future messages of LBS services), but rather provide a user initiated call for information (e.g., from a database). Accordingly, instead of the traditional LBS PUSH content/marketing, there may be provided LBS PULL content/marketing (e.g., a user has precise control over when, where and how they receive the content or marketing materials). For example, a user can "initiate a call" for discount coupons or customer service at precise location by using the user device to read the contactless interface point, and the database may trigger action rules that send out a 10% off discount to customer account or send out a notification to customer service, so customer service can contact the customer at this specify location.

FIG. 3B is an example flowchart of a method of the present disclosure. The user taps an RFID touchpoint with the user device. For example, the user may move the mobile device within a predefined range of RFID sticker. The user device reads the RFID with NFC. For example, user device may constantly or regularly poll for RFID information. The user device sends the RFID information to the network. The RFID information may include location information of the RFID. The network stored the RFID location information in the database associated with the user profile. In some cases, an external device (e.g., service provider terminal 120) may utilize the RFID location information to push services or functions to the user device. The database may also relay the location information back to the user device or an application executing on the user device (e.g., if the location information is encoded or otherwise not easily determinable by the RFID information). The user device may then perform actions, execute applications, and/or initialize functions based on the location information. In some cases, user location history may be captured, for example, for future behavioral analysis and/or to correlate with transaction locations to identify fraudulent behaviors.

As a non-limiting example, consider two users "A" and "B" in a same location at the same time. Both users use their user devices to read contactless interface points at the location and provide the location information to the database. The database determines location-based rules and user preferences, and then the database sends respective triggers (e.g., different triggers) to the user devices. Accordingly, User A may receive a discount, and User B might be provided new product introduction, despite reading a same contactless interface point at a same time.

In many instances, a user's mobile device may require an action to place it in an active state for receiving NFC transmissions. By not having a default active state, a hurdle is placed between the user and ready NFC communication. This can create inefficiencies in, for example, reading RFID signals using a mobile interface device (e.g., a smartphone). An aspect of the present invention is to make use of beacon technology to automatically activate and deactivate an NFC reader of a user device (particularly, a mobile interface device) without a required action on the part of the user. This provides significant improvements in efficiency and other functional advantages over the related art.

Figure 4A:
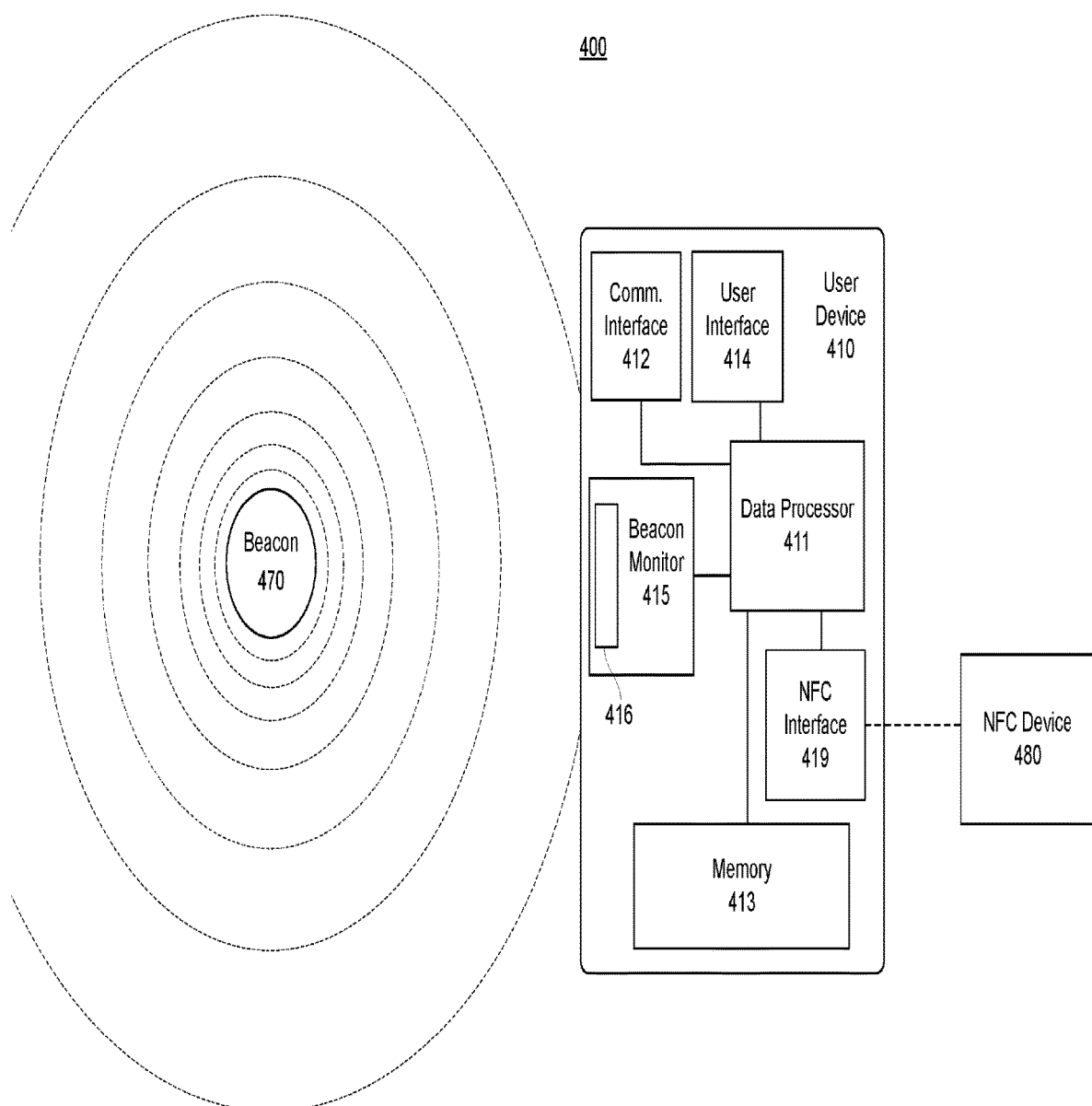
FIG. 4A illustrates a system for activating the NFC capability of a user device according to an embodiment of the invention.

FIG. 4A illustrates a system environment 400 for certain aspects of the present invention. In the system environment of FIG. 4A, a user device 410 (e.g., a mobile interface device) operated by a user, one or more NFC devices 480 (e.g., RFID tags or other transmission devices), and one or more beacons 470. In the descriptions that follow, the system environment 400 is a retail environment in the form of a retail store having multiple sales departments. It will be understood, however, that the invention is not restricted to the retail environment. Each beacon 470 is disposed within the store in the area of one of the sales departments (or another area) and has a major location identifier associated with the retail store location and a minor location identifier associated the sales department (or other area) location. Each beacon 470 is configured to broadcast a signal comprising its major and minor identifiers. In some embodiments, the beacon signal may also comprise a source identifier associated with the beacon-controlling entity (e.g., the merchant or parent company associated with the retail store). The beacons 470 will typically have an associated range volume throughout which the broadcast signal strength exceeds a level detectable by typical user devices.

The NFC devices 480 may be any NFC enabled transmitter and/or receiver positioned within the retail store. Each NFC device 480 may be specifically configured for communication with NFC-enabled user devices. In some embodiments, some or all of the NFC devices 480 may be part of or associated with merchant terminals and/or POS devices within the retail store.

As shown in FIG. 4A, the user device 410 includes an on-board data processor 411 in communication with a memory module 413, a user interface 414, a communication interface 412, a beacon monitor 415, and an NFC interface 419. The data processor 411 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 413 can be a read-only memory, write-once read-multiple memory or read/write memory, e.g., RAM, ROM and EEPROM, and the user device 410 can include one or more of these memories.

The user interface 414 includes a user input mechanism, which can be any device for entering information and instructions into the user device 410, such as a touch-screen, keyboard, mouse, cursor-control device, microphone, stylus, or digital camera. The user interface 414 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 412 is in data communication with the data processor 411 and is configured to establish and support wired or wireless data communication capability for connecting the device 410 to a communication network.

The beacon monitor 415 is in data communication with the data processor 411 and is configured to receive and process transmissions from the one or more beacons 470 via an antenna 416 or other beacon signal receiver, convert the signal to digital data, and forward the digital data to the data processor 411. The beacon monitor 415 may further be configured to determine the signal strength of a received transmission.

The NFC interface 419 is in data communication with the data processor 411 and is configured for establishing near field communication with any of the one or more NFC devices 480. Information received via the NFC interface 419 is forwarded to the data processor 411.

In various embodiments of the invention, the memory 413 may have stored therein one or more applications each comprising a plurality of instructions usable by the data processor 411 to conduct and/or monitor transactions between the user device 410 and merchant terminals, service providers, and transaction processing servers. These applications may include instructions usable by the data processor 411 to identify transaction events, store event data in the memory 413, and communicate event data to a transaction processor and/or a transaction monitoring system. Some applications may also include instructions relating to receiving and interpreting instructions from the transaction processor or transaction monitoring system.

The memory 413 has stored therein an NFC application comprising a plurality of instructions usable by the data processor 411 to establish communication with an NFC transmission device via the NFC interface 419. The NFC application is configured to have an active state in which placement of the user device 410 in contact with or within a predetermined NFC communication distance of an NFC device 480 causes the NFC device 480 to transmit information receivable via the NFC interface 419. The NFC application is further configured to have a passive state in which NFC communication is not established when the user device 410 is placed in contact with or within the predetermined NFC communication distance of an NFC device 480.

The memory 413 also has stored therein a beacon monitoring application. The beacon monitoring application is operable as a background application comprising a plurality of instructions usable by the data processor 411 to receive and process signal data from the beacon monitor 415. The beacon monitoring application is configured, in particular, to determine from the signal data, location identity information for the beacon 470 broadcasting the signal from which the signal data is derived. Depending on the application, the location identity information may include one or both of the major and minor location identifiers of the broadcasting beacon 470. The beacon monitoring application may be further configured to use the location identity information to determine a location of the beacon 470. This may be accomplished by comparing the location identity information to known beacon information stored in the memory 413. Alternatively, the location identity information may be transmitted to a central processor, which determines and returns the location of the beacon to the user device 410.

The beacon monitoring application may be further configured to determine, based on predetermined activation criteria whether the NFC interface should be changed from its passive state to its active state in response to the received beacon transmission. The activation criteria may include particular location identity information, beacon location, and signal strength. The activation criteria may also include or be varied based on timing and geographic considerations. In a particular example, the activation criteria may simply be that the signal is received from a beacon 470 having a major location identifier matching one of a list of identifiers associated with stores of a particular retail chain. In another example, the activation criteria might further include a requirement that the signal strength exceed an activation threshold value.

Upon determining that a beacon signal meeting the activation criteria has been encountered, the beacon monitoring application activates the NFC application (i.e., instructs the NFC application to move from its passive state to its active state). The beacon monitoring application may be still further configured to continue monitoring the beacon transmission after the NFC application has been activated. In particular embodiments, the application is configured to determine that deactivation criteria has been met, and, in response, deactivating the NFC application. In some applications, deactivation criteria may be or include the passage of a predetermined time interval after activation. In other applications, the deactivation criteria may be the loss of the beacon signal (at all or for at least a predetermined interval). In yet other applications, the deactivation criteria may include signal strength falling below a deactivation threshold value (at all or for at least a predetermined interval).

In some embodiments, the beacon monitoring application may be configured to detect a second beacon 470 and to determine if the second beacon has the same major location identifier as the first beacon 470. In such embodiments, the deactivation criteria may be established so that the NFC application remains active as long as a signal is being received from any beacon 470 having the same major location identifier as the beacon 470 whose signal originally triggered activation of the NFC application.

The above-described user device 410 provides for a seamless, hands-off user experience in which the user need not even be aware of the active or passive state of the NFC application. If desired, however, either the beacon monitoring application or the NFC application may be configured to notify the user via the user interface that the state of the NFC application has changed. In certain embodiments, a notification may be presented to the user prior to any such state change, the state change only taking place on receipt of user confirmation.

In an exemplary scenario, a user may cause the user device 410 to execute the beacon monitoring application in the background to detect beacons 470. When the user enters the broadcast area (or "zone") of a recognized beacon 470, the beacon is detected by the user device 410 and the NFC reader application on the user device is activated. The user may then use the user device 410 to interact with NFC transmitters within the broadcast area. This would allow, for example, instant reading of RFID information at a given location or touchpoint. Once the RFID information has been read, the user device 410 may operate in accordance with the discussion of other example embodiments herein. For example, the user device may output location information to a network, launch an application, launch a mobile function, or execute a transaction. All without the requirement that the user activate the NFC capability of the device. Thus, the combination of disparate technologies provides significant improvement to NFC and beacon technology application.

Continuing the exemplary scenario, when the user leaves the beacon's broadcast area, immediately or shortly thereafter, the NFC application will revert to its passive state. In some instances, leaving the beacon zone may trigger an additional or alternative action of the user device (e.g., an action in addition to or instead of transitioning to the NFC passive state). For example, if the beacon zone is in a store, leaving the beacon zone without making a purchase may trigger a discount request from the user device.

Figure 4B:
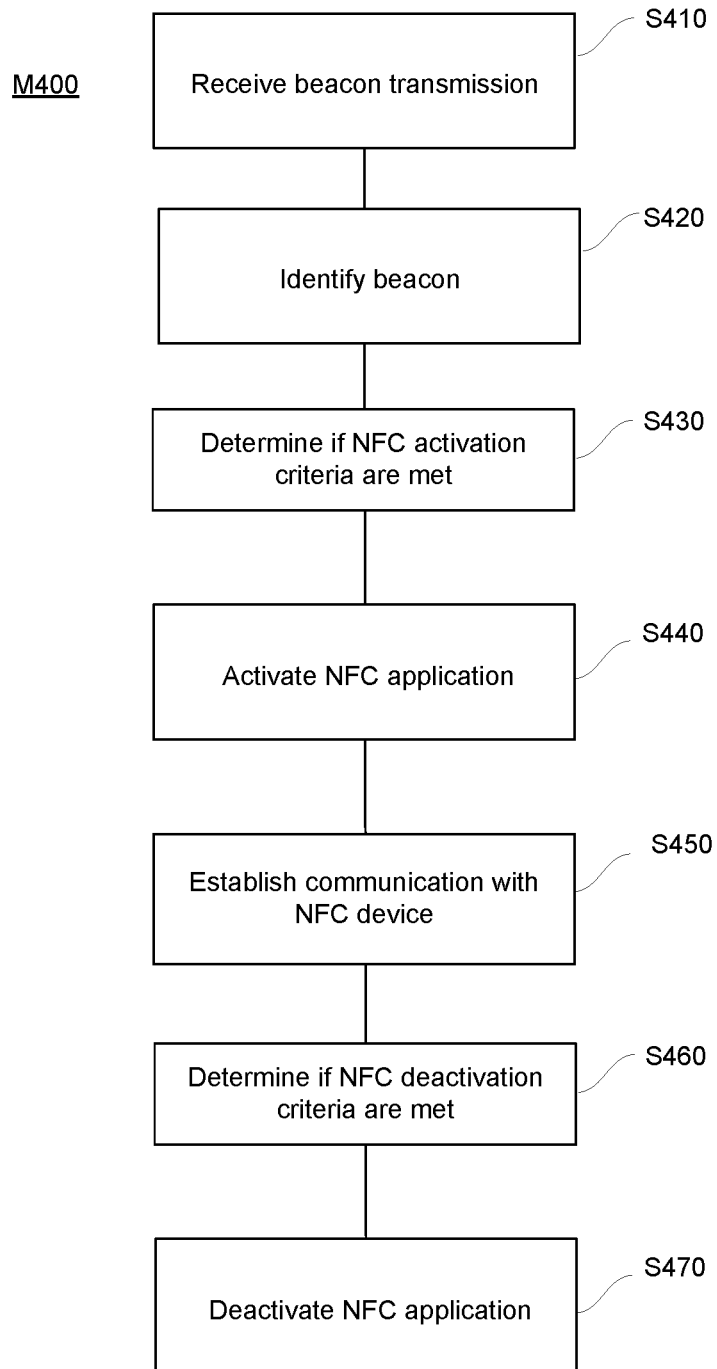
FIG. 4B is a flowchart of a method of activating an NFC application on a mobile interface device according to an embodiment of the invention.

FIG. 4B illustrates a method M400 of activating an NFC application in a user device 410 in accordance with an embodiment of the invention. The user device 410 may be, in particular, a mobile interface device such as a smart phone or tablet or other mobile device. At S410, a transmission from a beacon 470 is received by the user device 410, This will generally be the result of the user entering the transmission area of the beacon 470. In some instances, however, it could be the result of user already in this area activating the user device 410 or the beacon monitoring application of the device. As discussed above, the signal from the beacon 470 will include at least one beacon identifier, which can be used to identify the beacon 470 at S420. At S430, the user device 410 determines whether the criteria for activating the NFC capability of the user device have been met. As discussed above, this determination can be based solely on whether the beacon identifier is one of a predetermined set of authorized beacons or is associated with a predetermined authorized source. The determination may also be based on whether the strength of the beacon signal exceeds a predetermined threshold. In such embodiments, the method would also include determining a signal strength for the received beacon transmission.

Responsive to a determination that the activation criteria have been met, the NFC application of the user device 410 transitions from a passive state to an active state at S440. At S450, communication is established between the user device 410 and an NFC transmitting device (e.g., an RFID tag or POS device) disposed within the beacon transmission area. Additional NFC communications with other NFC transmitting devices can also be established. At S460, the user device 410 determines whether NFC deactivation criteria have been met. Responsive to the deactivation criteria being met, the NFC application of the user device 410 transitions from the active state to the passive state at S470. In some embodiments, the deactivation criteria is met if the signal is no longer being received or has not been received for longer than a predetermined time interval. In such embodiments, the action of determining would include monitoring the signal from the detected beacon 470 to determine if it is no longer being detected (e.g., due to the user having left the beacon transmission area). In some embodiments, the deactivation criteria is met when the signal strength of the transmission falls below a predetermined deactivation threshold or has been below that level for longer than a predetermined time interval. In such embodiments, the action of determining would include monitoring the level of the signal strength and comparing it to the deactivation threshold.

In some embodiments, meeting some or all of the deactivation criteria may trigger additional actions to be taken by the user device. Such actions may occur upon deactivation of the NFC application or may occur during a time interval triggered by loss of signal or drop in signal strength below a threshold level. These actions may include the user device transmitting a notification of the user's departure from the beacon area to a remote server over a communication network. This notification may include various exit information including, time of departure, time spent in the beacon area, transactions carried out, etc. Additional actions taken may include predetermined actions stored in the memory of the user device or received from the remote server. Such actions could include displaying visual and/or audible messages that could include, for example, notification that the user is leaving the beacon area and/or a plea to return (potentially with a promised discount). In some instances, the action could include the completion of a transaction initiated through NFC communications while inside the beacon area. For example, the user may have placed items in a virtual shopping cart via interaction with RFID tags within the beacon area. Departure from the beacon area (and, thus, meeting some or all of the deactivation criteria could trigger a "checkout" function to complete the purchase of the items in the shopping cart.

While traditionally only a single interaction is possible with RFID devices (i.e., an RFID is read or not), which limits the functionality of RFID devices to merely providing/acquiring to a single source of information, certain aspects of the present disclosure relate to the gesture-based interactions with one or more RFIDs.

FIG. 5A illustrates flow diagrams of certain aspects of the present disclosure. Based on the type of interaction with one or more RFID devices, the user device may perform different functions. For example, in 500-a, a user taps the user device (in RFID reader mode) to one or more RFID tags. The tap is detected by the user device, which in turn launches a first function ((e.g., a mobile function, launches an application, or performs some action). Tapping may be determined by an amount of time an RFID tag may be read being less than a threshold (e.g., how many times user device can read information from the RFID tag). At 500-b, the user touches the user device to one or more RFID tags and holds the user device for an extended period of time ((e.g., extended as compared to "tapping"). Touch and hold may be distinguished from tapping by an amount of time an RFID may be read being greater than the threshold. In some cases, more than one threshold read time or read numbers may create various hold-lengths, which launch different functionalities. In response, the user device may launch a second predetermined function. At 500-c, the user hovers the user device over one or more RFID tags. Thus, in contrast with a touch and hold or tap, the user device maintains a distance from the RFIDs. Hovering may be determined based on a strength of the RFID signal. For example, when an RFID is touched, a signal strength may be above a certain threshold is determined. When the RFID tag is hovered over (e.g., spaced apart of the user device), a signal strength may be below the strength threshold. In some cases, a plurality of signal strength thresholds (e.g., inch v. foot) and/or hovering time thresholds may be utilized to launch different functionalities. In response, the user device may launch a third predetermined function. In some cases, signal strength changes of the RFID tag may be recorded and used to customize differences if read distance and time to specific users. Furthermore, in some cases, a speed of approach and/or a pattern of approach or removal may be used to identify specific functions or otherwise specialize various gestures.

FIG. 5B is an example flowchart of a method of the present disclosure. The user performs one or more functions with the user device and the RFID tags. For example, the user may tap, touch and hold, or hover the user device to one or more RFID tags. The user device reads information from the one or more RFID tags, determines a type of gesture, and performs a function in accordance with the gesture and the RFID tag (e.g., the RFID information).

As will be understood in light of the present disclosure, a gesture may be performed with a single RFID tag or a plurality of RFID tags. In some cases, a sequence of gestures may be performed with a plurality of RFID tags. For example, a user may tap the user device to three different RFID tags in different orders to invoke different function. In some cases, a sequence of gestures may be performed on a single RFID tag. For example, a user may tap user device to a first RFID tag, and then hover the user device over the RFID tag. In some cases, gestures performed with the one or more RFID tags may be combined with gestures performed on the user device. For example, a user may tap an RFID tag and shake the user device, which launching a first function, or tap the RFID tag and rotate the user device, which launches a second function. Thus, as non-limiting example of improvements to RFID technology, RFID communication, and user devices, certain aspects of the present disclosure utilize one or more from among: a plurality of RFID tags; a sequence of RFID tags; RFID gestures; a sequence of RFID gestures; user device gestures; time between RFID and/or user device gestures (e.g., shave and a haircut timing); and accelerometer data. Accordingly, certain aspects of the present disclosure, working with a single or series of RFID tags, may exponentially extend the gesture-based interaction potential.

In some cases, customers belong to numerous loyalty and/or rewards programs. However, the related art does not provide simple ways for users to aggregate promotional data or track their loyalty programs from multiple merchants. Moreover, in the related art, RFID information is static or otherwise difficult to change. Accordingly, certain aspects of the present disclosure relate to the use of RFID tags (e.g., RFID stickers) to collect promotional or incentive-based data.

Figure 6A:
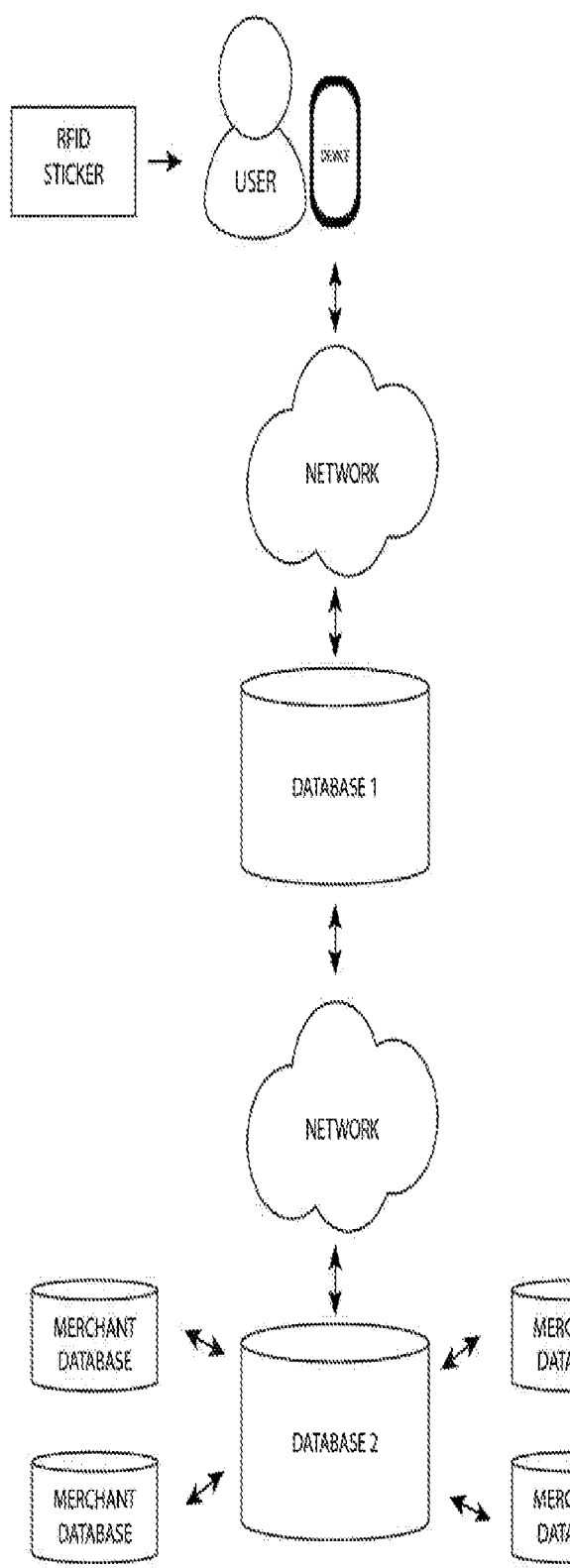
FIG. 6A illustrates a system environment for implementing certain aspects of the present disclosure.

FIG. 6A is a system environment for implementing certain aspects of the present disclosure. In the system environment of FIG. 6A, a user device (e.g., user device 110, which may be a mobile device) operated by a user, an NFC device (e.g., an RFID sticker), a network (e.g., network 190), database 1 (e.g., service provider database system 130), database 2 (e.g., a second service provider database system 130), and one or more merchant databases (e.g., merchant database systems 150) may interact. The user may operate the user device to execute an RFID reader application, and the user may move the user device near the RFID sticker. The user device may read the RFID sticker and send the RFID information to database 1 over the network. Database 1 may recall (e.g. retrieve) the value for the RFID sticker from database 2 (e.g., over the network). Database 2 may receive updates to the RFID value from the merchant databases. In some cases, utilizing database 1 and database 2 provides a platform for partner aggregation and collaboration. For example, database 1 may be controlled by a first, and database 2 may be controlled by a partner merchant. In some cases, database 1 and/or database 2 may be controlled by one or more entities.

The RFID information may be static or otherwise difficult to change. For example, the RFID information may include an identifier for the RFID sticker. Functionality associated with the RFID sticker may therefore be determined based on mappings in database 1 or database 2. The merchant databases may set or change the functionality associated with the RFID sticker, for example, but accessing database 2 over the network. As a non-limiting example, the RFID sticker may be placed a first merchant location (e.g., at a store entrance). Upon entering the store, the user may tap the RFID sticker. The user device reads and sends the RFID information to database 1. Database 1 requests that database 2 indicate functionality is associated with the RFID sticker ((e.g., functionality set by the corresponding merchant database). Database 2 may notify database 1 about the associated functionality, for example, a 10% discount on purchases that data. Database 1 may relay that information to the user device. Thus, the user is notified about the daily discount. Merchant database may adjust the meaning (e.g., value or action taken) associated with the RFID sticker as often as desired (e.g., daily or weekly), and the same RFID sticker may therefore be mapped to different information or functionality.

Figure 6B:
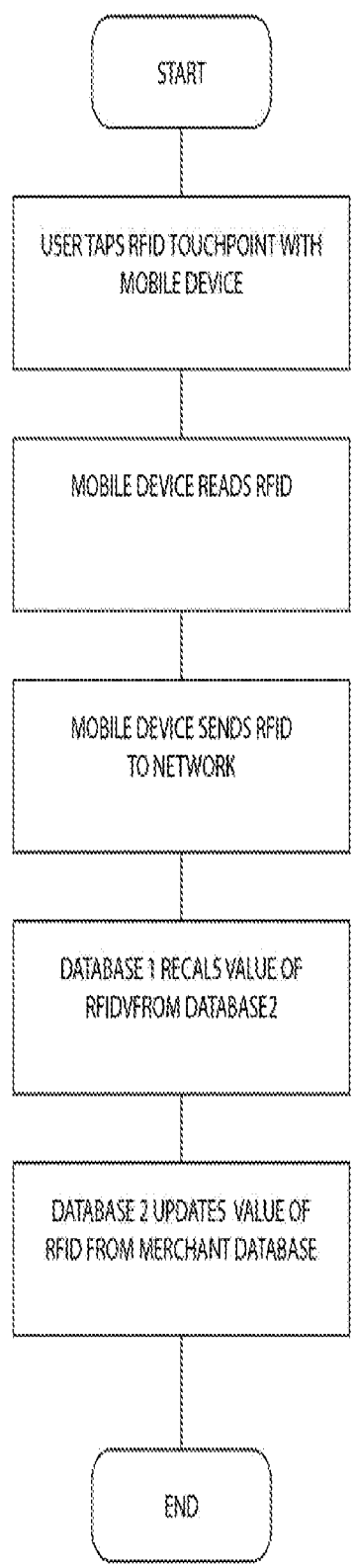
FIG. 6B is an example flowchart of a method of the present disclosure.

FIG. 6B is an example flowchart of a method of the present disclosure. The user places the user device near the RFID sticker. The user device reads the RFID information and sends the RFID information to database 1 over the network. Database 1 recalls the value of the RFID from database 2. Database 2 be updated by merchant databases, thus changing the value of RFID.

As discussed above, while the functionality of RFID devices readers is typically limited to the acquiring of a single source of information, certain aspects of the present disclosure relate to enhancement of RFID functionality addressing these and other issues.

Figure 7A:
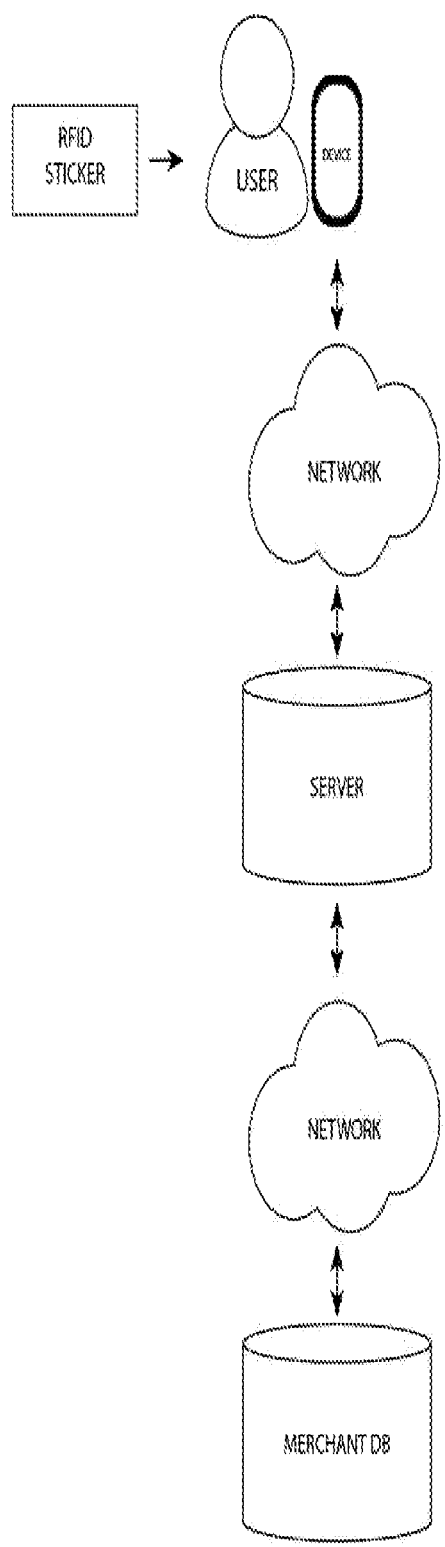
FIG. 7A illustrates a system environment for implementing certain aspects of the present disclosure.

FIG. 7A is a system environment for implementing certain aspects of the present disclosure. In the system environment of FIG. 7A, a user device (e.g., user device 110, which may be a mobile device) operated by a user, an NFC device (e.g., an RFID sticker), a network (e.g., network 190), a server (e.g., service provider terminal 120), and a merchant database (e.g., merchant database system 150) may interact. The user may operate the user device as would be appreciated by one of ordinary skill, for example, the user device may execute an RFID reader application, and the user may move the user device near the RFID sticker. The user device may read and send the RFID information to the server over the network. The server may relay the RFID information to the merchant database, which relays the corresponding function back to the user device (e.g., either through the server or through a separate connection). In some cases, the user device may display a prompt for a user to confirm to take the action. In some embodiments, the user device may automatically coordinate with the merchant database and/or server, as necessary, to perform the function.

The RFID information may be static or otherwise difficult to change. For example, the RFID information may include an identifier for the RFID sticker. The function associated with the RFID sticker may therefore be determined based on mappings in the merchant database. As a non-limiting example, the RFID may be provided to the user by the merchant. The RFID information may be associated with an account the user has with the merchant (e.g., a user account). For example, the user may log-in to the user account on the user device and scan the RFID sticker to associate the RFID sticker and/or its information with the user account. Thereafter, when the RFID sticker is read by the user device, the appropriate functionality will be performed. In some cases, a same RFID sticker may be independently associated with different user accounts/user devices, such that a first function will be executed when a first user device reads the RFID sticker, while a second function will be executed when the second user device reads the RFID sticker.

The RFID sticker's function may be enabled using, for example, if-this then-that ((IFTTT) applets. In some cases, the function may be an order command (e.g., when the user device reads the RFID sticker, an item is ordered from the merchant) or some other predefined trigger. In some cases, a user may log-into the user account to set or adjust the function associated with the RFID sticker for the user device. Accordingly, the function triggered by the RFID sticker may be reprogrammable, enhancing the functionality of RFID stickers (e.g., RFID tags) and RFID readers. In some cases, a user can utilize a graphical user interface to "program" (e.g., set or select) what happens when the user reads a particular tag (or performs particular gestures with the particular tag). For example, a user may determine (e.g., program or configure) whether reading an RFID sticker at a coffee shop records the user's visit for a loyalty program or places an order for the user's favorite coffee. As another example, a user may determine (e.g., program or configure) whether reading an RFID sticker on a laundry detergent box launches a browser to provide stain removal instructions, or reorders the detergent.

Figure 7B:
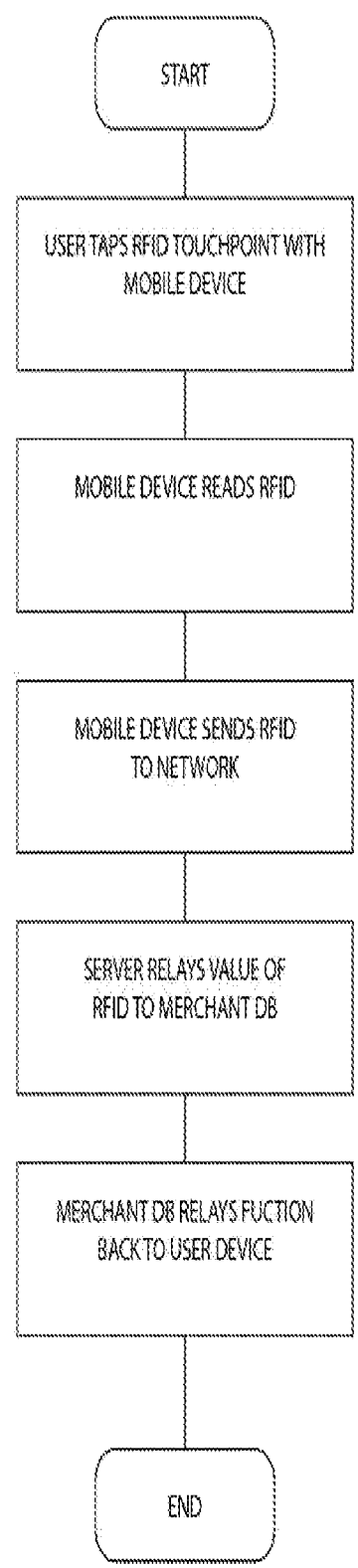
FIG. 7B is an example flowchart of a method of the present disclosure.

FIG. 7B is an example flowchart of a method of the present disclosure. The user places the user device near the RFID sticker (e.g., taps the RFID sticker). The user device reads and sends the RFID information to the server over the network. The server relays the value of the RFID information to the merchant database. The merchant database determines the function associated with the RFID sticker and relays the function back to the user device.

Some aspects of the present disclosure extend the RFID capability to allow customers, organizations, and/or merchants to tie mobile related actions within a user device. As non-limiting examples, a merchant could setup "dynamic promotions" so that users grab their devices and interact with the user (or the user RFID network); a user could setup a "re-order item" function for the RFID at home—tapping the RFID sticker with the user device would reorder the item; and an organization could setup "payment functions" associated with an RFID at a user's home (or rental)—tapping the RFID with the user device initiates the payment (e.g., rent payment, credit card payment, bank deposit, etc.).

While traditional private label merchant credit lines (e.g., merchant branded credit cards) are often maintained by third-parties, which can be expensive and have limited fraud detection/authorization check points that lead to unnecessary costs, certain aspects of the present disclosure relate to enhancement of RFID functionality addressing these and other issues.

Figure 8A:
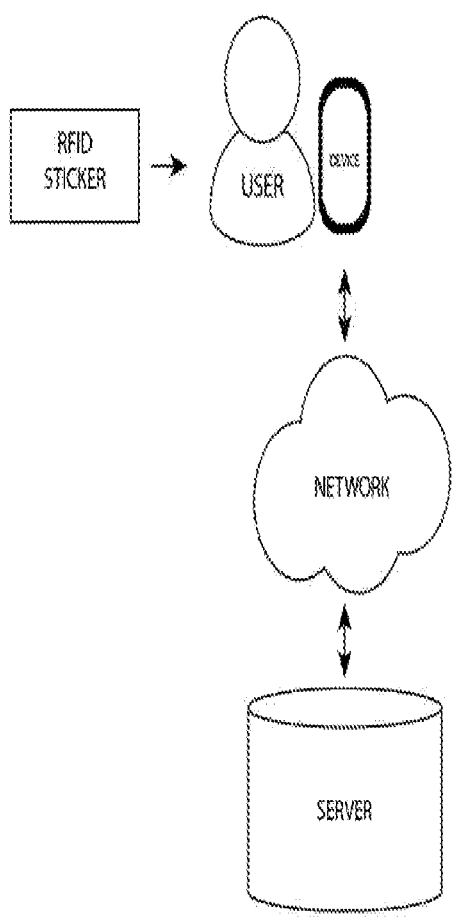
FIG. 8A illustrates a system environment for implementing certain aspects of the present disclosure.

FIG. 8A is a system environment for implementing certain aspects of the present disclosure. In the system environment of FIG. 8A, a user, a user device (e.g., user device 110 or a mobile device), an NFC device (e.g., an RFID sticker), a network (e.g., network 190), and a server (e.g., service provider terminal 120). The user may operate the user device to execute an RFID reader application, and the user may move the user device near the RFID sticker. The user device may read and send the RFID information to the server over the network. The server may redemption/transaction values to the user device, and transaction may be performed utilizing the user device as a POS device.

In some cases, a plurality of RFID stickers may be dispersed throughout a merchant location (e.g., a store). The RFID stickers may, for example, be linked to discount/promotional codes or values, and/or specific items. Accordingly, as a user shops, selected items and discounts may be added to a user's virtual checkout "cart." When a user scans a checkout RFID sticker (e.g., an RFID sticker at a designated checkout area), the scanning may trigger POS functionality of the user device. The user device may transmit the RFID information for the coupons and/or items to the server, and the server may inform the user device as to the transaction value. The user may then use the user device to finalize the transaction.

Figure 8B:
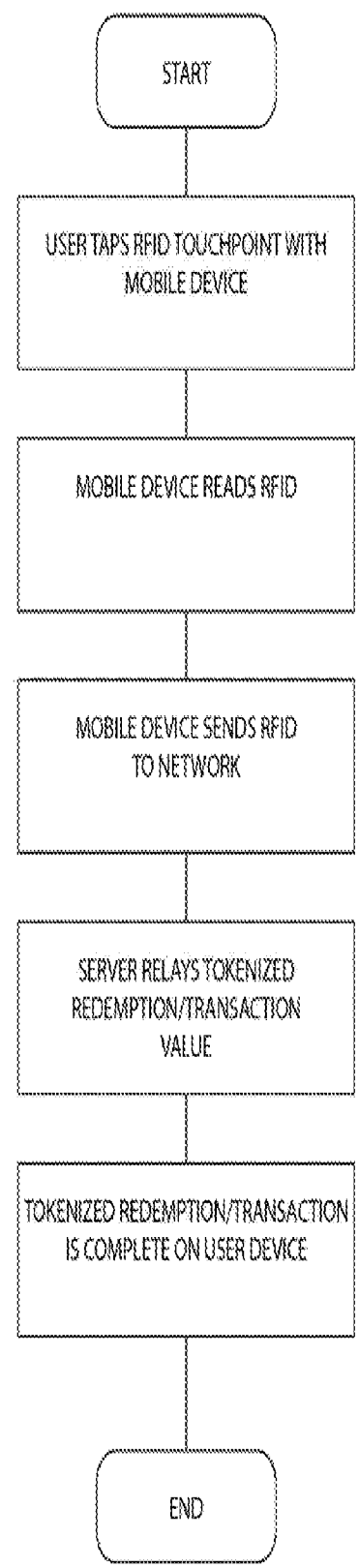
FIG. 8B is an example flowchart of a method of the present disclosure.

FIG. 8B is an example flowchart of a method of the present disclosure. The user places the user device near the RFID sticker (e.g., taps the RFID sticker). The user device reads and sends the RFID information to the server over the network. The server relays the tokenized redemption and/or transaction values to the user device based on the RFID information. The tokenized redemption/transaction is then completed on the user device. According to some aspects of the present disclosure, a user may access and utilize their merchant account at that particular merchant through their mobile device by tapping on an RFID-enabled checkout touchpoint. The touchpoint verifies the merchant location (i.e., is confirmed to belong to the merchant) and the transaction is processed within the user device. Accordingly, user/transaction authentication and merchant location remove the merchant's POS from the purchase flow and improve transaction security through enhancements to the user device and RFID functionality (e.g., providing multi-factor user authentication via the user device and merchant RFID).

Figure 9:
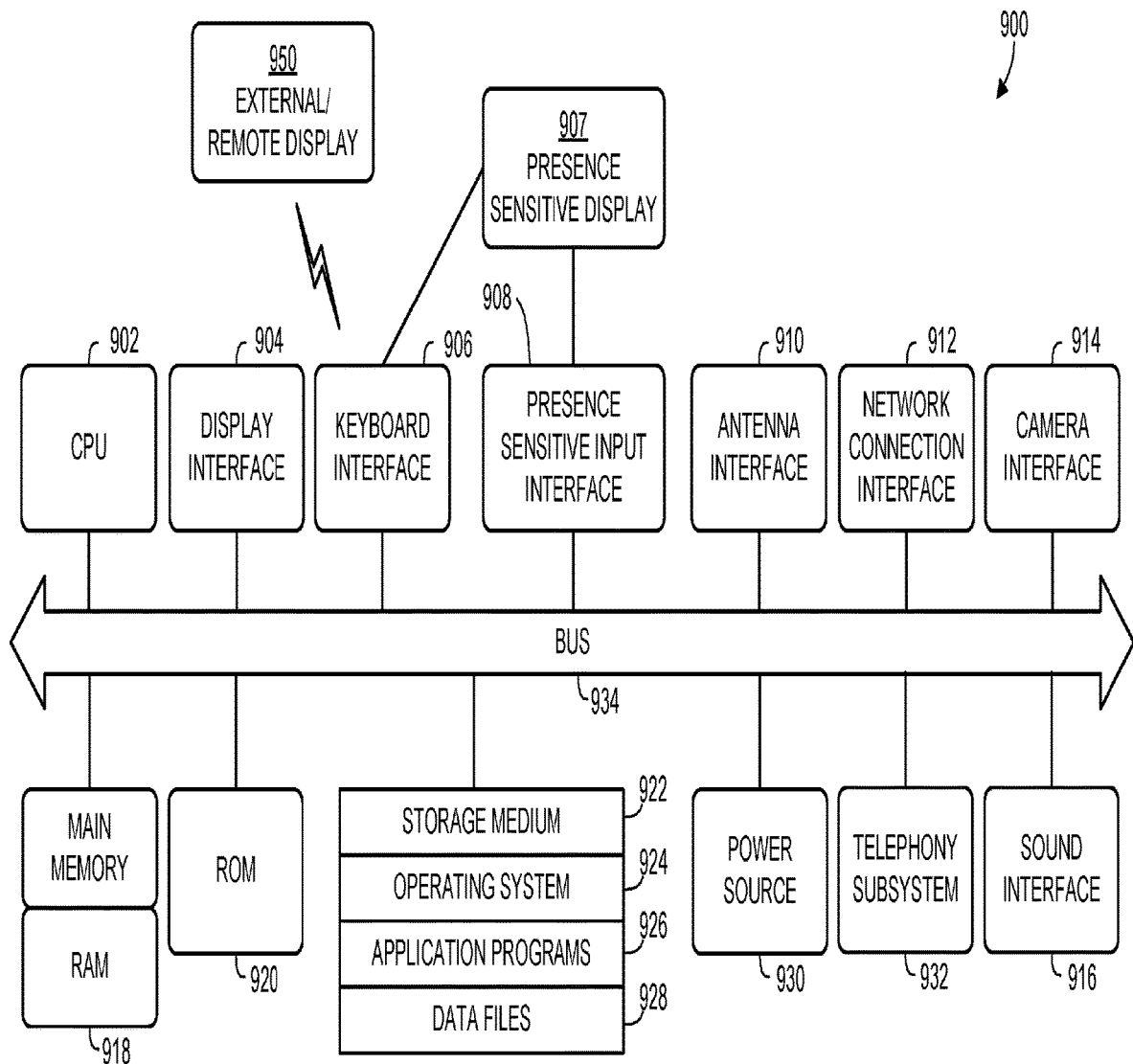
FIG. 9 is a computer architecture block diagram according to an example embodiment.

FIG. 9 is a block diagram of an illustrative computer system architecture 900, according to an example implementation. As non-limiting examples, one or more of user device 110, service provider terminal 120, service provider database system 130, merchant terminal 140, merchant database system 150, and beacon 170 may be implemented using one or more elements from the computer system architecture 900. It will be understood that the computing device architecture 900 is provided for example purposes only and does not limit the scope of the various implementations of the present disclosed systems, methods, and computer-readable mediums.

The computing device architecture 900 of FIG. 9 includes a central processing unit ((CPU) 902, where computer instructions are processed, and a display interface 904 that acts as a communication interface and provides functions for rendering video, graphics, images, and texts on the display. In certain example implementations of the disclosed technology, the display interface 904 may be directly connected to a local display, such as a touch-screen display associated with a mobile computing device. In another example implementation, the display interface 904 may be configured for providing data, images, and other information for an external/remote display 950 that is not necessarily physically connected to the mobile computing device. For example, a desktop monitor may be used for mirroring graphics and other information that is presented on a mobile computing device. In certain example implementations, the display interface 904 may wirelessly communicate, for example, via a Wi-Fi channel or other available network connection interface 912 to the external/remote display 950.

In an example implementation, the network connection interface 912 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication ((NFC) port, another like communication interface, or any combination thereof. In one example, the display interface 904 may be operatively coupled to a local display, such as a touch-screen display associated with a mobile device. In another example, the display interface 904 may be configured to provide video, graphics, images, text, other information, or any combination thereof for an external/remote display 950 that is not necessarily connected to the mobile computing device. In one example, a desktop monitor may be used for mirroring or extending graphical information that may be presented on a mobile device. In another example, the display interface 904 may wirelessly communicate, for example, via the network connection interface 912 such as a Wi-Fi transceiver to the external/remote display 950.

The computing device architecture 900 may include a keyboard interface 906 that provides a communication interface to a keyboard. In one example implementation, the computing device architecture 900 may include a presence-sensitive display interface 908 for connecting to a presence-sensitive display 907. According to certain example implementations of the disclosed technology, the presence-sensitive display interface 908 may provide a communication interface to various devices such as a pointing device, a touch screen, a depth camera, etc. which may or may not be associated with a display.

The computing device architecture 900 may be configured to use an input device via one or more of input/output interfaces (for example, the keyboard interface 906, the display interface 904, the presence sensitive display interface 908, network connection interface 912, camera interface 914, sound interface 916, etc.) to allow a user to capture information into the computing device architecture 900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 900 or may be a separate device. For example, the input device may be an accelerometer, a magnetometer, a digital camera, a microphone, and an optical sensor.

Example implementations of the computing device architecture 900 may include an antenna interface 910 that provides a communication interface to an antenna; a network connection interface 912 that provides a communication interface to a network. As mentioned above, the display interface 904 may be in communication with the network connection interface 912, for example, to provide information for display on a remote display that is not directly connected or attached to the system. In certain implementations, a camera interface 914 is provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, a random-access memory ((RAM) 918 is provided, where computer instructions and data may be stored in a volatile memory device for processing by the CPU 902.

According to an example implementation, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device architecture 900 includes a storage medium 922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device architecture 900 includes a power source 930 that provides an appropriate alternating current (AC) or direct current (DC) to power components.

According to an example implementation, the computing device architecture 900 includes a telephony subsystem 932 that allows the device 900 to transmit and receive sound over a telephone network. The constituent devices and the CPU 902 communicate with each other over a bus 934.

According to an example implementation, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 to execute software programs. Data may be stored in the RAM 918, where the data may be accessed by the computer CPU 902 during execution.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may include a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method of activating a near field communication (NFC) application in a mobile interface device, the NFC application having a first state in which the mobile interface device is incapable of NFC communication and a second state in which the mobile interface device is capable of NFC communication, the method comprising:
   receiving, by the mobile interface device, a wireless beacon signal from a transmitting beacon associated with an authorized merchant;
   determining a signal strength of the wireless beacon signal;
   comparing the signal strength to an activation threshold; and
   responsive to a determination that the signal strength exceeds the activation threshold, transitioning, by the mobile interface device, the NFC application from the first state to the second state.

2. The automated method according to claim 1 further comprising:
   monitoring the beacon signal by the mobile interface device to detect a drop in beacon signal strength below a deactivation threshold value.

3. The automated method according to claim 2 further comprising:
   responsive to detecting the drop in the beacon signal strength below the deactivation threshold value, transitioning, by the mobile interface device, the NFC application from the active state to the passive state.

4. The automated method according to claim 2 further comprising:
   responsive to detecting the drop in the beacon signal strength below the deactivation threshold value, initiating, by the mobile interface device, a timed sequence having a predetermined duration;
   responsive to a detection of an increase in beacon signal strength above the threshold value during the timed sequence, terminating the timed sequence by the mobile interface device; and
   upon the timed sequence reaching the predetermined duration without the increase in beacon signal strength above the threshold value, the mobile interface device terminating the timed sequence, and
   transitioning the NEC application from the active state to the passive state.

5. The automated method according to claim 4 further comprising:
   during the timed sequence, the mobile interface device carrying out at least one action from the set consisting of
   transmitting exit information to a server via a network,
   carrying out exit instructions received from a server via a network, and
   carrying out exit instructions stored on the mobile interface device.

6. The automated method according to claim 5 wherein the exit instructions include an instruction to carry out at least one action from the set consisting of
   displaying a visual message to a user of the mobile interface device; and
   sounding an audible message to the user of the mobile interface device.

7. The automated method according to claim 2 further comprising:
   responsive to detecting the drop in the beacon signal strength below the deactivation threshold value, initiating, by the mobile interface device, a timed sequence having a predetermined duration;
   receiving, by the mobile interface device during the timed sequence, a second wireless beacon signal from a second transmitting beacon associated with the authorized merchant
   determining a signal strength of the second wireless beacon signal;
   comparing the signal strength of the second wireless beacon signal to the activation threshold; and
   responsive to a determination that the signal strength of the second wireless beacon signal exceeds the activation threshold, terminating the timed sequence by the mobile interface device.

8. The automated method according to claim 7 further comprising:

monitoring the second beacon signal by the mobile interface device to detect a drop in signal strength of the second wireless beacon below the deactivation threshold value;
responsive to detecting the drop in the beacon signal strength of the second wireless beacon below the deactivation threshold value, re-initiating, by the mobile interface device, the timed sequence;
responsive to a detection of an increase in beacon signal strength of the second wireless beacon above the threshold value during the reinitiated timed sequence, terminating the reinitiated timed sequence by the mobile interface device; and
upon the timed sequence reaching the predetermined duration, the mobile interface device terminating the timed sequence, and
transitioning the NFC application from the active state to the passive state.

9. A mobile interface device, comprising:
a data processor;
a wireless communication interface in communication with the data processor and configured for selective communication over a wireless network;
a near field communication (NFC) interface;
a beacon signal receiver configured for receiving a beacon signal from a transmitting beacon and for determining a signal strength of the beacon signal;
a user interface comprising at least a user input device and a display;
a memory accessible by the data processor, the memory having stored thereon
an NFC application having a passive state and an active state, the NFC application including instructions for the data processor to receive an NFC signal from an NFC transmitting device via the NFC interface when the NFC application is in the active state and to prevent reception of NFC signals when the NFC application is in the passive state, and
a beacon monitoring application including instructions for the data processor to
receive the beacon signal and the signal strength from the beacon signal receiver,
process the beacon signal to identify the transmitting beacon,
determine whether the transmitting beacon is associated with an authorized merchant,
compare the signal strength to an activation threshold, and
responsive to determinations that the transmitting beacon is associated with an authorized merchant and that the signal strength exceeds the activation threshold, transition the NFC application from the passive state to the active state.

10. The mobile interface device of claim 9, wherein the beacon monitoring application includes instructions for the data processor to
monitor the beacon signal to detect a drop in signal strength below a deactivation threshold value.

11. The mobile interface device of claim 10, wherein the beacon monitoring application includes instructions for the data processor to, responsive to detecting the drop in the beacon signal strength below the deactivation threshold value,
transition the NFC application from the active state to the passive state.

12. The mobile interface device of claim 10, wherein the beacon monitoring application includes instructions for the data processor to, responsive to detecting the drop in the beacon signal strength below the deactivation threshold value,
initiate a timed sequence having a predetermined duration,
responsive to a detection of an increase in beacon signal strength above the threshold value during the timed sequence, terminate the timed sequence, and
upon the timed sequence reaching the predetermined duration without an increase in beacon signal strength above the threshold value,
terminate the timed sequence, and
transition the NFC application from the active state to the passive state.

13. The mobile interface device of claim 12, wherein the beacon monitoring application includes instructions for the data processor to, during the timed sequence,
carry out at least one action from the set consisting of
transmitting exit information to a server via the wireless network,
carrying out exit instructions received from a server via the wirelines network, and
carrying out exit instructions stored in the memory.

14. The mobile interface device of claim 13, wherein the exit instructions include an instruction to carry out at least one action from the set consisting of
displaying a visual message to a user of the mobile interface device, and
sounding an audible message to the user of the mobile interface device.

15. The mobile interface device of claim 10, wherein the beacon monitoring application includes instructions for the data processor to, responsive to detecting the drop in the beacon signal strength below the deactivation threshold value,
initiate a timed sequence having a predetermined duration,
receive, from the beacon signal receiver during the timed sequence, a second wireless beacon signal of a second transmitting beacon and a second signal strength,
determine if the,
compare the second signal strength to the activation threshold, and
responsive to determinations that the second transmitting beacon is associated with the authorized merchant and that the second signal strength exceeds the activation threshold, terminate the timed sequence by the mobile interface device.

16. The mobile interface device of claim 15, wherein the beacon monitoring application includes further instructions for the data processor to, responsive to determinations that the second transmitting beacon is associated with the authorized merchant and that the second signal strength exceeds the activation threshold,
monitor the second beacon signal to detect a drop in the second signal strength below the deactivation threshold value, and
responsive to detecting the drop in the second signal strength below the deactivation threshold value, re-initiate, by the mobile interface device, the timed sequence,
responsive to a detection of an increase in the second signal strength above the deactivation threshold value during the reinitiated timed sequence, terminate the reinitiated timed sequence, and
upon the reinitiated timed sequence reaching the predetermined duration, terminate the timed sequence, and
transition the NEC application from the active state to the passive state.

17. A near field communication (NFC) system comprising:
a beacon for transmitting a beacon signal comprising at least one beacon identifier, the beacon having a beacon location and a beacon signal range;
an NFC transmitting device disposed within a beacon range volume defined by the beacon location and the beacon signal range; and
a user interface device comprising
a data processor,
a NFC interface,
a beacon signal receiver configured for receiving a beacon signal from a transmitting beacon and for determining a signal strength of the beacon signal,
a memory accessible by the data processor, the memory having stored thereon
an NFC application having a passive state and an active state, the NFC application configured for allowing communication between the data processor and the NFC transmitting device via the NFC interface when the NFC application is in the active state and preventing communication between the data processor and the NFC transmitting device via the NFC interface when the NFC application is in the passive state, and
a beacon monitoring application configured for instructing the data processor to receive the beacon signal and the signal strength from the beacon signal receiver,
determine whether the transmitting beacon is associated with an authorized merchant,
determine whether the signal strength exceeds an activation threshold, and
responsive to determinations that the transmitting beacon is associated with an authorized merchant and that the signal strength exceeds the activation threshold, transition the NFC application from the passive state to the active state.

18. The NFC system of claim 17, wherein the beacon monitoring application is further configured to
monitor the beacon signal to detect a drop in signal strength below a deactivation threshold value.

19. The NFC system of claim 17, wherein the beacon monitoring application is further configured to, responsive to detecting the drop in the beacon signal strength below the deactivation threshold value,
transition the NFC application from the active state to the passive state.

20. The NFC system of claim 17, wherein the beacon monitoring application is further configured to, responsive to detecting the drop in the beacon signal strength below the deactivation threshold value,
initiate a timed sequence having a predetermined duration,
responsive to a detection of an increase in beacon signal strength above the threshold value during the timed sequence, terminate the timed sequence, and
upon the timed sequence reaching the predetermined duration without an increase in beacon signal strength above the threshold value,
terminate the timed sequence, and
transition the NEC application from the active state to the passive state.

* * * * *